(12) United States Patent
Deike et al.

(10) Patent No.: US 10,005,904 B2
(45) Date of Patent: Jun. 26, 2018

(54) SELF-LEVELLING, ANHYDROUS COATING MATERIALS FOR FLOOR SURFACES

(75) Inventors: Hans-Detlef Deike, Bad Laer (DE); Udo Raabe, Versmold (DE)

(73) Assignee: BOSTIK, S.A., Courbevoie (FR)

( * ) Notice: Subject to any disclaimer, the term of this patent is extended or adjusted under 35 U.S.C. 154(b) by 378 days.

(21) Appl. No.: 12/520,885

(22) PCT Filed: Dec. 14, 2007

(86) PCT No.: PCT/EP2007/010999
§ 371 (c)(1),
(2), (4) Date: Dec. 23, 2009

(87) PCT Pub. No.: WO2008/077510
PCT Pub. Date: Jul. 3, 2008

(65) Prior Publication Data
US 2010/0092787 A1    Apr. 15, 2010

(30) Foreign Application Priority Data

Dec. 23, 2006   (DE) .................. 10 2006 061 458

(51) Int. Cl.
*E04F 15/20* (2006.01)
*C08L 71/02* (2006.01)
*C08G 65/336* (2006.01)
*E04F 15/12* (2006.01)

(52) U.S. Cl.
CPC ............ *C08L 71/02* (2013.01); *C08G 65/336* (2013.01); *E04F 15/12* (2013.01); *E04F 15/20* (2013.01); *Y10T 428/31663* (2015.04)

(58) Field of Classification Search
None
See application file for complete search history.

(56) References Cited

U.S. PATENT DOCUMENTS

| | | | | |
|---|---|---|---|---|
| 3,231,542 A | * | 1/1966 | Eisinger | C08K 3/38 502/160 |
| 4,429,068 A | * | 1/1984 | Nakahira | 524/302 |
| 5,286,780 A | | 2/1994 | Iwakiri et al. | |
| 5,373,042 A | | 12/1994 | Bride et al. | |
| 5,476,889 A | * | 12/1995 | Owen | 524/170 |
| 7,446,158 B2 | | 11/2008 | Okamoto et al. | |
| 2003/0069331 A1 | * | 4/2003 | Teiichi | C08G 59/18 523/176 |
| 2003/0188921 A1 | * | 10/2003 | Kakimoto et al. | 181/285 |
| 2004/0121089 A1 | * | 6/2004 | Whiting | 428/15 |
| 2005/0107499 A1 | * | 5/2005 | Georgeau | B32B 11/02 524/59 |
| 2005/0211580 A1 | * | 9/2005 | Kaszubski et al. | 206/223 |
| 2006/0047063 A1 | * | 3/2006 | Schaub | A61K 6/10 524/588 |
| 2007/0088110 A1 | | 4/2007 | Kohl et al. | |
| 2008/0021140 A1 | | 1/2008 | Wakabayashi et al. | |
| 2012/0142857 A1 | * | 6/2012 | Hatanaka et al. | 524/789 |

FOREIGN PATENT DOCUMENTS

| | | | |
|---|---|---|---|
| DE | 44 29 205 | 2/1996 | |
| DE | 199 41 284 | 3/2001 | |
| EP | 337791 A2 * | 10/1989 | .............. C08L 83/04 |
| EP | 0 397 036 | 11/1990 | |
| EP | 0531971 | 3/1993 | |
| EP | 01 695 989 | 8/2006 | |
| EP | 1731573 | 12/2006 | |
| EP | 1746134 | 1/2007 | |
| JP | 09 188809 | 7/1997 | |
| JP | 2004107652 | 4/2004 | |
| JP | 2005 264126 | 9/2005 | |
| JP | 2006117753 | 5/2006 | |
| WO | 9620975 | 7/1996 | |
| WO | 2005108520 | 11/2005 | |

OTHER PUBLICATIONS

JP 09-188809 Machine Translation (Jul. 22, 1997).*
"One Component Moisture Curing Methoxysilane Sealants", Cray Valley, Mar. 2001.*
MS Polymr Silyl-Terminated Polyethers for Sealants and Adhesives of a New Generation, Kaneka, Oct. 1999.*
CAS Registry No. 1760-24-3 for TSL 8340, Scifinder (2014).*
Selecting the Right Aminosilane Adhesion Promoter for Hybrid Sealants Mack (2005).*
CAS Registry Nos. for 303H and 303 (2015).*
International Search Report for International Application No. PCT/EP2007/010999 dated May 19, 2008.
Manual Brookfield Digital Rheometer; Model DV-III; Manuel No. M/91-210-1297; pp. 37 & 38.
Kaneka MS Polymer S303H; Aug. 2003; pp. 1-6.
Kaneka Silyl SAT010; Mar. 2004; pp. 1-6.
CAS Abstract—205 265-06-1.
Kaneka MS Polymer S203H; Jul. 2002; pp. 1-6.
JP-2004-107652; English Translation.
JP-2006-117753; English Abstract.
EP Opposition to 2994788; May 4, 2015.
English Translation of EP Opposition to 2994788; May 4, 2015.

* cited by examiner

*Primary Examiner* — Kenneth J Stachel
(74) *Attorney, Agent, or Firm* — Millen White Zelano and Branigan, PC

(57) ABSTRACT

The invention describes self-levelling, anhydrous coating materials on floor surfaces, consisting of silane-modified polyethers, preferably methoxyalkylsilane-terminated polyoxypropylenes, calcium carbonate powder, drying agent, curing catalyst, adhesion promoter and optionally further additives and/or fillers. The moisture-curing coating materials obtained, preferably used on cement- or calcium sulphate-bound floor surfaces, are distinguished by good adhesion, high sound insulation, a barrier effect against rising moisture and excellent surface planarity, as are desired for the laying of hard floors, in particular laminate or parquet boards.

15 Claims, No Drawings

SELF-LEVELLING, ANHYDROUS COATING MATERIALS FOR FLOOR SURFACES

CROSS-REFERENCE TO RELATED APPLICATIONS

This application is the U.S. National Stage filing of International Application No. PCT/EP2007/010999, filed Dec. 14, 2007, which claims priority to German Patent Application No. 10 2006 061 458.5, filed Dec. 23, 2006, the disclosure of which is hereby incorporated in its entirety by reference.

The present invention relates to self-levelling, anhydrous coating materials for floor surfaces consisting of silane-terminated polyoxyalkylenes, preferably methoxyalkyl-terminated polyoxypropylenes, chalk powder, drying agent, curing catalyst, adhesion promoter and optionally further additives. The coatings form the surface for hard floors, in particular for parquet or laminate boards.

The term hard floor is used for differentiation from floor coverings where the panels or strips are flexible and soft, as is true, for example, for PVC, rubber or carpet floors. Laminate or parquet floors on the other hand are typical examples of hard floors since the boards consist of hard materials.

According to the prior art, the hard floors are either firmly connected to the surface by adhesive bonding or, as is customary today in particular in areas not subject to commercial use, are laid in a floating manner. Surfaces, i.e. sub-floors, for the coatings are usually screeds; however, all other surfaces, such as, for example, tiles or chipboards, are also suitable.

Floating hard floors, for example comprising wood, plastic or ceramic materials, however, have the unpleasant property of producing perceptible footfall noises during use. Footfall occurs as structure-borne sound during pushing back of chairs, walking or similar processes and is partly radiated as air-borne sound in rooms underneath or above. In addition, the structure-borne sound mentioned propagates itself in the hard floor.

Furthermore, when laying hard floors, it is necessary to prevent the rise of water from the sub-floors because otherwise the floor elements may suffer warping and swelling. In order to avoid this, different sealing systems, such as, for example, sheets, membranes or coatings, are installed under the hard floors.

In addition, the laying surface of the sub-floor must be made completely flat in order to rule out elevations or unevenness of the hard floor, but also air-filled cavities under the hard floor. In fact, such cavities amplify the structure-borne sound by reflection.

According to the prior art the hard floor elements, for example panels of rigid plastic or wood, can be laid on insulating mats of cork, foam, corrugated board, nonwovens of natural or synthetic material or similar substances. The footfall sound occurring during walking can then be absorbed by elastic deformation and hence damped. Technical proposals of this type are to be found, for example, in the applications DE 29922444, JP 2002194652 or DE 102004050131.

In practice, however, the laying of the insulating mats is very problematic because the insulation easily slips or insulating sheets become creased and then not only the insulation but also the planarity of the surface and hence of course also the quality of the hard floor are called into question.

For these reasons, attempts have long been made to fasten the sound insulation and the moisture barrier directly to the backs of the hard floor covering panels by various methods. A large number of applications follows these objectives; WO 02/100638, DE 20105881, DE 29923734, EP 1247923 or EP 1001111 may be mentioned by way of example.

However, even these proposals for an insulating layer on the back are not completely convincing from the technical point of view since the room and footfall insulation continues to be inadequate. This is because the surfaces are usually not completely level and the hard floor elements then cannot be laid on them with contact of the whole area. Also disadvantageous in the case of these proposals are the relatively high technical complexity in the production and hence the not inconsiderable additional costs incurred.

In view of the prior art described above, it is an object of the present invention to provide a self-levelling, anhydrous coating material for sub-floors which 1) has good sound-insulating properties, 2) acts as a barrier against moisture rising from the surface and 3) permits the production of a level surface for the subsequent laying of the floating hard floor. In addition, the coating material should be easy to apply and economical to prepare.

This object is achieved by the features of Claims 1, 2 and 4. Advantageous embodiments of the invention are given in sub-claims 3 and 5.

For the laying of hard floors, for example laminate or parquet panels, the self-levelling, anhydrous coating materials according to the invention on floor surfaces are applied directly to the sub-floors by means of a knife coater or toothed spatula. Owing to the adjustable viscosity, the coating material spreads in a self-levelling manner to the same height. Layer thicknesses of at least 1 mm have proved to be expedient for sound insulation; however, layer thicknesses of 1.5 to 3 mm are more advantageous. Layer thicknesses substantially above 3 mm should not be used.

The curing by atmospheric humidity in the case of 2 mm layer thickness then takes about 24 hours, depending on air temperature and atmospheric humidity. Thereafter, the hard floor can be laid immediately. Customary surfaces (sub-floors) for such hard floors are, for example, cement or calcium sulphate floor surfaces, mastic asphalt, concrete floors or stone floors.

Hybrid polymers comprising skeletal polymers, such as, for example, polypropylene oxide, were developed over 25 years ago. The silane groups predominantly carry methoxy groups, from which methanol is liberated by atmospheric humidity during the curing process. The resulting silanol groups then react further with crosslinking to give an elastic and insoluble polymeric network. This reaction can be accelerated by the addition of curing catalysts, practically condensation catalysts.

The hybrid polymers, more accurately prepolymers, are marketed by the industry under the name MS polymers (modified silane polymers). In the book "Kleben [Adhesive bonding], Springer Verlag, 3rd edition, Berlin, 1997", G. Habenicht gives an overview of this technology. A further description can therefore be dispensed with here.

An advantageous development of the invention is given in patent Claim 5. According to this claim, a mixture of two methoxyalkylsilane-terminated polyoxypropylenes having a viscosity of 5 to 10 Pa·s and 10 to 25 Pa·s, respectively (measured at 20° C. and a shear gradient of $1\ s^{-1}$) in a mass ratio of 5:1 to 1:5 is used. The alkyl groups may contain 1 to 10 carbon atoms. By means of this combination of the two types of MS polymers, the flow behaviour of the claimed coating material can be optimally adjusted between low-viscosity and viscous.

The viscosity of the silane-modified polyoxypropylene prepolymers is determined by the molar masses or the molar mass distribution of the MS polyoxypropylene. In practice, the number average molar mass of the silane-terminated polyoxypropylene prepolymers used, i.e. before hydrolytic elimination of methoxy groups, should be between about 1000 and about 30 000 g/mol.

According to Claim 4, the solvent-free and anhydrous coating materials contain 30 to 70% by mass of hydrophobized and/or untreated, ground calcium carbonate. The materials used are rendered hydrophobic with customary stearin compounds, such as, for example, calcium stearate or stearic acid. The stearate content should not exceed 3% here.

In general, the object of adding calcium carbonate is to adjust the physical and mechanical properties of the claimed coating materials as far as possible to comply with the application. In particular, flow behaviour and stability are advantageously influenced by the addition of chalk. At the same time, the viscosity can be increased to the desired level.

The particle size of the calcium carbonate powders used may vary within a wide range, depending on the layer thicknesses strived for. In the context of the present invention, however, chalk powder having particle sizes of less than 20 μm, and particularly preferably less than 10 μm are preferably used.

In order to accelerate the curing of the coatings according to the invention after application, silanol condensation catalysts (curing catalysts) are added during the preparation. Carboxylates and chelates of tin, of titanium and of aluminium have proved to be particularly suitable. Dibutyltin diacetylacetonate is particularly suitable. The proportion by mass of the catalyst is 0.1 to 5% by mass, preferably 0.3 to 1% by mass.

Since the methoxy groups of the silane-terminated prepolymers hydrolyse and crosslink under the action of moisture and in the presence of a curing catalyst, it is necessary to add a drying agent with the function of a water scavenger to the claimed coating materials during the preparation. As a result, the shelf-life of the adhesives and sealants can be ensured. A particularly suitable drying agent is vinyltrimethoxysilane. Owing to the electronic structure of this compound, the methoxy groups of the drying agent hydrolyse very much more rapidly than the methoxy groups of the MS polymers used. Only when the drying agent has been substantially consumed does the crosslinking of the MS polymers take place. The added amounts of vinyltrimethoxysilane depend on the water content of the starting materials; in practice, they are generally about 1% by mass.

For improving the adhesive properties of the liquid coatings on surfaces adhesion promoters, especially silane-based ones, may also be added. Additions of 0.2 to 5% by mass of aminosilanes, such as, for example, aminopropyltriethoxysilane or aminopropyltrimethoxysilane have proved to be expedient.

In addition, the coatings may contain customary additives, such as, in particular, coloured pigments, plasticizers, light and heat stabilizers, dispersants and fillers, such as, for example, dolomite, talc, mica and barite and pyrogenic silica having a reinforcing effect, altogether in an amount of 0 to 50% by mass.

Coloured pigments, such as, for example, titanium dioxide, iron oxide, carbon black or organic colorants, are suitable for colouring the formulations.

In addition, the light stability of the coating materials according to the invention can be improved by photostabilizers. The so-called HALS compounds (sterically hindered light stabilizers), such as, for example, bis(2,2,6,6-tetramethyl-4-piperidyl) sebacate, or compounds from the group consisting of the benzotriazoles, such as, for example, 2,4-di-tert-butyl-6-(5-chlorobenzotriazol-2-yl)phenol, are particularly suitable for this purpose.

For plasticizing, it is possible to resort to tried and tested compounds. The known phthalic esters, cyclohexane dicarboxylic esters or polypropylene glycols may be primarily mentioned here.

The coating materials according to the invention are prepared in vacuum mixers which are operated batchwise. The liquid silane-terminated polymer components (MS polymers) are weighed out and are initially taken in the mixer; then, if desired, plasticizers, pigments and light stabilizers are added. These starting materials are carefully mixed and thereafter the solid components, mainly calcium carbonate powder, are incorporated with strong shearing and with simultaneous application of a slight vacuum (about 100 mbar).

After cooling of the batch to about 50° C. or below, the drying agent is incorporated. Thereafter, the adhesion promoters and curing catalysts can be added and mixed in. Since gas bubbles may have formed again in the batch after aeration, degassing is effected briefly once again. The finished coating materials are filled into metal or plastic containers, sealed air-tight and stored until use.

The self-levelling, anhydrous coating materials according to the invention, intended for the coating of sub-floors before laying of hard floors, are used in the industrial sector by craftsmen and by DIY workers. The claimed coating materials adhere to all customary technical surfaces, such as, for example, plastics, wood, concrete, ceramic or other mineral building materials. The desired layer thickness can be easily established via the amount applied; 1 to 3 mm are customary and about 2 mm is preferred.

After curing, for about 24 hours in the case of 2 mm, the hard floor, preferably laminate or parquet floor, can be laid immediately. After curing, the coating materials according to the invention effectively reduce the water vapour diffusion with $s_d$ values of about 10 m (water vapour diffusion-equivalent air layer thickness) at a coating thickness of 2 mm.

Of particular importance, however, is the sound-insulating effect of the liquid coating under the hard floor elements. Experimental measurements according to DIN EN ISO 140-8 have shown that 2 mm thick layers of the claimed liquid coating under laminate panels of 7 mm thickness and a mass per unit area of 6 kg/m$^2$ gave a footfall reduction of up to 15 dB(A). This value is substantially more advantageous than the case of insulating mats which are of the same thickness but have been loosely laid.

EXAMPLES

Example 1

The coating material was prepared according to the following formulation:
20 kg of polyoxypropylene, dimethoxymethylsilane-terminated, 8 Pa·s
10 kg of polyoxypropylene, dimethoxymethylsilane-terminated, 12 Pa·s
0.6 kg of titanium dioxide pigment
10 kg of diisononyl phthalate 0.20 kg of bis(2,2,6,6-tetramethyl-4-piperidyl)sebacate
40 kg of hydrophobized calcium carbonate powder (90% by mass<10 μm)
1.0 kg of vinyltrimethoxysilane
0.6 kg of aminopropyltriethoxysilane
0.6 kg of dibutyltin diacetylacetonate For testing, the coating material obtained was spread in a layer thickness of 2 mm on ceramic tiles and left to cure for 1 week at 25° C. and 60% relative humidity. The characteristic values obtained from the tests are listed in table 1.

Example 2

The coating material was prepared according to the following formulation:
20 kg of polyoxypropylene, dimethoxymethylsilane-terminated, 10 Pa·s
10 kg of polyoxypropylene, dimethoxymethylsilane-terminated, 20 Pa·s
20 kg of diisodecyl phthalate
0.1 kg of carbon black
0.2 kg of bis(2,2,6,6-tetramethyl-4-piperidyl)sebacate
0.2 kg of 2,4-di-tert-butyl-6-(5-chlorobenzotriazol-2-yl)phenol
50 kg of hydrophobized calcium carbonate powder, 90% by mass<10 μm
1.5 kg of vinyltrimethoxysilane
0.75 kg of aminopropyltrimethoxysilane
0.75 kg of dibutyltin diacetylacetonate For testing, the material was spread in a layer thickness of 2 mm on a chipboard and left to cure for 2 days at 25° C. and 60% relative humidity. The characteristic values were then determined (table 1).

TABLE 1

| Characteristic value | Example 1 | Example 2 |
| --- | --- | --- |
| Density (kg/l) | 1.5 | 1.5 |
| Skin formation (min) (25° C., 60% relative humidity) | 100 | 75 |
| Complete curing (h), 2 mm (25° C., 60% relative humidity) | 24 | 18 |
| Shore A hardness | 38 | 30 |
| Heat stability ° C. (according to DIN 52123) | 80 | 75 |
| Water resistance (20° C.) | + | + |
| Water vapour diffusion coefficient | 4500 | 5000 |
| Water impermeability (at 0.4 N/mm$^2$) | + | + |
| Footfall reduction (dB(A)*) (According to DIN EN ISO 140-8) | 13 | 16 |

*)The values of the standard footfall level on a cement floor surface with coating and without coating were determined: 2 mm layer thickness of the coating; 7 mm laminate panels and mass per unit area of 6 kg/m$^2$.

The invention claimed is:

1. A method of producing a floor comprising the steps of:
  (a) applying a self-leveling, anhydrous coating material to a surface, wherein said coating material comprises:
    20 to 60% by mass of silane-terminated polyoxyalkylenes comprising a first methoxyalkylsilane-terminated polyoxypropylene having a viscosity of 5 to 10 Pa·s and a second methoxyalkylsilane-terminated polyoxypropylene having a viscosity of 10 to 25 Pa·s, wherein the viscosities are measured at 20° C. and a shear gradient of 1 s$^{-1}$:
    30 to 70% by mass of calcium carbonate,
    0.5 to 5% by mass of drying agent,
    0.1 to 5% by mass of curing catalyst, and
    0.2 to 5% by mass of adhesion promoter,
    wherein the coating material spreads in a self-leveling manner to a height that is the same;
  (b) curing said coating material by atmospheric humidity; and
  (c) applying a floating hard floor on the cured coating material,
  wherein said cured coating material provides noise insulation.

2. The method of claim 1, wherein the floating hard floor is a laminate or parquet floor.

3. The method of claim 1, wherein the surface is a subfloor and wherein the self-leveling, anhydrous coating material is applied directly to the sub-floor, resulting in a layer with a thickness of 1 to 3 millimeters.

4. The method of claim 1, wherein the cured coating material provides a water barrier.

5. The method of claim 1, wherein the cured coating material provides an even surface for laying floating hard floors.

6. The method of claim 1, wherein the coating material further comprises cumulatively up to 50% by mass of an amount of colored pigments, plasticizers, dispersants, other fillers and light and heat stabilizers, of mixtures thereof.

7. The method of claim 1, wherein the cured coating material has a thickness of about 2 millimeters.

8. The method of claim 1, wherein the calcium carbonate is hydrophobized.

9. The method of claim 1, wherein the silane-terminated polyoxyalkylenes are present in an amount of 29-36% by mass.

10. The method of claim 1, wherein the calcium carbonate has a particle size of less than 20 μm.

11. The method of claim 10, wherein the particle size of calcium carbonate is less than 10 μm.

12. The method of claim 1, wherein the first methoxyalkylsilane-terminated polyoxypropylene has alkyl groups of up to 10 carbon atoms and the second methoxyalkylsilane-terminated polyoxypropylene has alkyl groups of up to 10 carbon atoms wherein the mass ratio of the first and second methoxyalkylsilane-terminated polyoxypropylenes is from 5:1 to 1:5.

13. The method of claim 12, wherein the mass ratio of the first and second methoxyalkylsilane-terminated polyoxypropylenes is 2:1.

14. The method of claim 12, wherein the viscosity of the second methoxyalkylsilane-terminated polyoxypropylene having alkyl groups of up to 10 carbon atoms is 12-20 Pa·s.

15. The method of claim 12, wherein the viscosity of the second methoxyalkylsilane-terminated polyoxypropylene having alkyl groups of up to 10 carbon atoms is 12-25 Pa·s.

\* \* \* \* \*